(12) United States Patent
Ho et al.

(10) Patent No.: US 11,631,076 B1
(45) Date of Patent: Apr. 18, 2023

(54) SYSTEMS AND METHODS FOR MOBILE WALLET PROVISIONING

(71) Applicant: Wells Fargo Bank, N.A., San Francisco, CA (US)

(72) Inventors: Peter Ho, Walnut Creek, CA (US); Ashish B. Kurani, Hillsborough, CA (US); Brian M. Pearce, Pleasanton, CA (US); Steven E. Puffer, Champlin, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/373,392

(22) Filed: Jul. 12, 2021

Related U.S. Application Data

(63) Continuation of application No. 15/370,095, filed on Dec. 6, 2016, now Pat. No. 11,062,302, which is a
(Continued)

(51) Int. Cl.
*G06Q 20/36* (2012.01)
*G06Q 20/24* (2012.01)
(Continued)

(52) U.S. Cl.
CPC ......... *G06Q 20/3672* (2013.01); *G06Q 20/24* (2013.01); *G06Q 20/26* (2013.01);
(Continued)

(58) Field of Classification Search
CPC .... G06Q 20/3672; G06Q 20/24; G06Q 20/26; G06Q 20/3226; G06Q 20/3821; G06Q 20/405
See application file for complete search history.

(56) References Cited

U.S. PATENT DOCUMENTS

| | | |
|---|---|---|
| 6,324,524 B1 | 11/2001 | Lent et al. |
| 7,121,456 B2 | 10/2006 | Spaeth et al. |

(Continued)

FOREIGN PATENT DOCUMENTS

| | | |
|---|---|---|
| EP | 3 761 248 | 6/2021 |
| KR | 20160064061 A | 6/2016 |

(Continued)

OTHER PUBLICATIONS

Borchert, B.; Gunther, M.;Indirect NFC-Login on a Non-NFC Device using an NFC-Smartphone; international Journal of Intelligent Computing Research; vol. 4, Iss. 4, Dec. 2013; 7 Pages.
(Continued)

*Primary Examiner* — Tuyen K Vo
(74) *Attorney, Agent, or Firm* — Foley & Lardner LLP

(57) ABSTRACT

A method for provisioning a payment account to a mobile wallet on a mobile device includes receiving, by a provider computing system, an encrypted network return address of the mobile wallet that uniquely identifies a network address of the mobile wallet when the encrypted network return address is decrypted from an initiating device, receiving, by the provider computing system, an encryption key configured to decrypt the encrypted network return address, wherein the encryption key is not provided to the initiating device, decrypting, by the provider computing system, the encrypted network return address using the encryption key, and provisioning, by the provider computing system, a payment token associated with the payment account to the mobile wallet based on the decrypted network return address received from the initiating device by transmitting the payment token to the mobile device without going through the initiating device.

20 Claims, 5 Drawing Sheets

Related U.S. Application Data continuation of application No. 15/255,880, filed on Sep. 2, 2016, now Pat. No. 11,113,688.

(60) Provisional application No. 62/326,676, filed on Apr. 22, 2016.

(51) Int. Cl.
| | |
|---|---|
| *G06Q 20/26* | (2012.01) |
| *G06Q 20/32* | (2012.01) |
| *G06Q 20/40* | (2012.01) |
| *G06Q 20/38* | (2012.01) |

(52) U.S. Cl.
CPC ..... *G06Q 20/3226* (2013.01); *G06Q 20/3821* (2013.01); *G06Q 20/405* (2013.01)

(56) References Cited

U.S. PATENT DOCUMENTS

| | | |
|---|---|---|
| 8,205,249 B2 | 6/2012 | Meister et al. |
| 8,245,292 B2 | 8/2012 | Buer |
| 8,313,022 B2 | 11/2012 | Hammad et al. |
| 8,352,323 B2 | 1/2013 | Fisher |
| 8,355,982 B2 | 1/2013 | Hazel et al. |
| 8,380,177 B2 | 2/2013 | Laracey |
| 8,430,325 B2 | 4/2013 | Jain |
| 8,452,707 B2 | 5/2013 | Sharma |
| 8,511,547 B2 | 8/2013 | Rans et al. |
| 8,635,157 B2 | 1/2014 | Smith et al. |
| 8,639,629 B1 | 1/2014 | Hoffman |
| 8,763,896 B2 | 7/2014 | Kushevsky et al. |
| 8,856,045 B1 | 10/2014 | Patel et al. |
| 8,910,055 B2 | 12/2014 | Berger |
| 8,977,569 B2 | 3/2015 | Rao |
| 9,135,619 B1 | 9/2015 | Simakov et al. |
| 9,183,480 B1 | 11/2015 | Quigley et al. |
| 9,195,984 B1 | 11/2015 | Spector et al. |
| 9,256,873 B2 | 2/2016 | Patel et al. |
| 9,317,848 B2 | 4/2016 | Hammad |
| 9,367,845 B2 | 6/2016 | Candelore et al. |
| 9,542,673 B2 | 1/2017 | Tanner et al. |
| 9,547,859 B2 | 1/2017 | Patel et al. |
| 9,576,285 B2 | 2/2017 | Zhou |
| 9,619,794 B2 | 4/2017 | Zhou et al. |
| 9,652,770 B1 | 5/2017 | Kurani et al. |
| 9,785,943 B2 | 10/2017 | Phillips et al. |
| 9,805,370 B1 | 10/2017 | Quigley et al. |
| 9,830,328 B2 | 11/2017 | Faith et al. |
| 9,830,589 B2 | 11/2017 | Xing |
| 9,846,863 B2 | 12/2017 | Grossi et al. |
| 9,852,426 B2 | 12/2017 | Bacastow |
| 9,928,493 B2 | 3/2018 | Parker et al. |
| 9,947,183 B2 | 4/2018 | Priebatsch |
| 10,049,352 B2 | 8/2018 | Klingen et al. |
| 10,074,231 B2 | 9/2018 | Miranda et al. |
| 10,089,624 B2 | 10/2018 | Hammad et al. |
| 10,162,956 B1 | 12/2018 | Truong et al. |
| 10,198,725 B2 | 2/2019 | Royyuru et al. |
| 10,373,138 B2 | 8/2019 | Hammad |
| 10,438,210 B1 | 10/2019 | Perezleon et al. |
| 10,467,622 B1 | 11/2019 | Rule et al. |
| 10,586,224 B2 | 3/2020 | Tanner et al. |
| 10,607,214 B1 | 3/2020 | Rule et al. |
| 10,685,349 B2 | 6/2020 | Brickell et al. |
| 10,719,833 B2 | 7/2020 | Patel et al. |
| 10,803,463 B1 | 10/2020 | Barnum et al. |
| 2002/0023051 A1 | 2/2002 | Kunzle et al. |
| 2003/0061154 A1 | 3/2003 | Chacko |
| 2005/0234860 A1 | 10/2005 | Roever et al. |
| 2005/0246193 A1 | 11/2005 | Roever et al. |
| 2005/0269402 A1 | 12/2005 | Spitzer et al. |
| 2006/0035707 A1 | 2/2006 | Nguyen et al. |
| 2007/0187491 A1 | 8/2007 | Godwin et al. |
| 2008/0010215 A1 | 1/2008 | Rackley, III et al. |
| 2008/0035725 A1 | 2/2008 | Jambunathan et al. |
| 2008/0242274 A1 | 10/2008 | Swanburg et al. |
| 2009/0143104 A1 | 6/2009 | Loh et al. |
| 2009/0156238 A1 | 6/2009 | Smith |
| 2009/0200371 A1 | 8/2009 | Kean et al. |
| 2010/0125509 A1 | 5/2010 | Kranzley et al. |
| 2010/0198728 A1 | 8/2010 | Aabye et al. |
| 2010/0276484 A1 | 11/2010 | Banerjee et al. |
| 2010/0293382 A1 | 11/2010 | Hammad |
| 2010/0306072 A1 | 12/2010 | Ford et al. |
| 2010/0312703 A1 | 12/2010 | Kulpati et al. |
| 2011/0112968 A1 | 5/2011 | Florek et al. |
| 2011/0270755 A1 | 11/2011 | Pinski |
| 2012/0039469 A1 | 2/2012 | Mueller |
| 2012/0078735 A1 | 3/2012 | Bauer et al. |
| 2012/0095852 A1 | 4/2012 | Bauer et al. |
| 2012/0123937 A1 | 5/2012 | Spodak |
| 2012/0136786 A1 | 5/2012 | Romagnoli et al. |
| 2012/0149331 A1 | 6/2012 | Wu et al. |
| 2012/0209749 A1 | 8/2012 | Hammad et al. |
| 2012/0290449 A1 | 11/2012 | Mullen et al. |
| 2012/0290472 A1 | 11/2012 | Mullen et al. |
| 2012/0323717 A1 | 12/2012 | Kirsch |
| 2013/0054412 A1 | 2/2013 | Brendell et al. |
| 2013/0054474 A1 | 2/2013 | Yeager |
| 2013/0092741 A1 | 4/2013 | Loh et al. |
| 2013/0117138 A1 | 5/2013 | Hazel et al. |
| 2013/0124346 A1 | 5/2013 | Baldwin et al. |
| 2013/0152185 A1 | 6/2013 | Singh et al. |
| 2013/0159178 A1 | 6/2013 | Colon et al. |
| 2013/0166441 A1 | 6/2013 | Kobylkin et al. |
| 2013/0171929 A1 | 7/2013 | Adams et al. |
| 2013/0198066 A1 | 8/2013 | Wall et al. |
| 2013/0226791 A1 | 8/2013 | Springer et al. |
| 2013/0238455 A1 | 9/2013 | Laracey |
| 2013/0246203 A1 | 9/2013 | Laracey |
| 2013/0262302 A1 | 10/2013 | Lettow et al. |
| 2013/0317928 A1 | 11/2013 | Laracey |
| 2013/0318575 A1 | 11/2013 | Hart et al. |
| 2014/0001253 A1 | 1/2014 | Smith |
| 2014/0019352 A1 | 1/2014 | Shrivastava |
| 2014/0052637 A1 | 2/2014 | Jooste et al. |
| 2014/0061299 A1 | 3/2014 | Scipioni |
| 2014/0074637 A1 | 3/2014 | Hammad |
| 2014/0101734 A1 | 4/2014 | Ronda et al. |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0122331 A1 | 5/2014 | Vaish et al. |
| 2014/0129435 A1 | 5/2014 | Pardo et al. |
| 2014/0161258 A1 | 6/2014 | Yang et al. |
| 2014/0172577 A1 | 6/2014 | Rephlo |
| 2014/0207680 A1 | 7/2014 | Rephlo |
| 2014/0229377 A1 | 8/2014 | Vakklaganti |
| 2014/0279522 A1 | 9/2014 | Musser et al. |
| 2014/0337236 A1 | 11/2014 | Wong et al. |
| 2014/0339315 A1 | 11/2014 | Ko |
| 2014/0344153 A1 | 11/2014 | Raj et al. |
| 2014/0370851 A1 | 12/2014 | Wang et al. |
| 2014/0372308 A1 | 12/2014 | Sheets |
| 2015/0004934 A1 | 1/2015 | Qian et al. |
| 2015/0032569 A1 | 1/2015 | Stromberg |
| 2015/0032625 A1 | 1/2015 | Dill et al. |
| 2015/0046276 A1 | 2/2015 | Artman et al. |
| 2015/0046339 A1 | 2/2015 | Wong et al. |
| 2015/0046340 A1 | 2/2015 | Dimmick |
| 2015/0081538 A1 | 3/2015 | Renard et al. |
| 2015/0149336 A1 | 5/2015 | Haggerty et al. |
| 2015/0156601 A1 | 6/2015 | Donnellan et al. |
| 2015/0161591 A1 | 6/2015 | Yang |
| 2015/0170137 A1 | 6/2015 | Balbus |
| 2015/0186871 A1 | 7/2015 | Laracey |
| 2015/0195133 A1 | 7/2015 | Sheets et al. |
| 2015/0248664 A1 | 9/2015 | Makhdumi et al. |
| 2015/0269565 A1 | 9/2015 | Inotay et al. |
| 2015/0356560 A1 | 12/2015 | Shastry et al. |
| 2015/0371234 A1 | 12/2015 | Huang et al. |
| 2016/0078434 A1 | 3/2016 | Huxham et al. |
| 2016/0086166 A1 | 3/2016 | Pomeroy et al. |
| 2016/0142174 A1 | 5/2016 | Fine et al. |

(56) References Cited

U.S. PATENT DOCUMENTS

| | | |
|---|---|---|
| 2016/0147526 A1 | 5/2016 | Camp et al. |
| 2016/0162883 A1 | 6/2016 | Liscia et al. |
| 2016/0173483 A1 | 6/2016 | Wong et al. |
| 2016/0180330 A1 | 6/2016 | Feldman |
| 2016/0232524 A1 | 8/2016 | Barrale et al. |
| 2016/0241402 A1 | 8/2016 | Gordon et al. |
| 2016/0247233 A1 | 8/2016 | Page |
| 2016/0253651 A1 | 9/2016 | Park et al. |
| 2016/0292673 A1 | 10/2016 | Chandrasekaran |
| 2016/0307184 A1 | 10/2016 | Peyton et al. |
| 2016/0307186 A1 | 10/2016 | Noe et al. |
| 2016/0364938 A1 | 12/2016 | Miranda et al. |
| 2017/0004506 A1 | 1/2017 | Steinman et al. |
| 2017/0046679 A1 | 2/2017 | Gotlieb et al. |
| 2017/0109745 A1 | 4/2017 | Al-Bedaiwi et al. |
| 2017/0116615 A1 | 4/2017 | Burgess et al. |
| 2017/0262819 A1 | 9/2017 | Malhotra et al. |
| 2017/0302637 A1 | 10/2017 | Baba |
| 2017/0316493 A1 | 11/2017 | Numata |
| 2018/0012226 A1 | 1/2018 | Phillips et al. |
| 2018/0025349 A1 | 1/2018 | Marsh |
| 2018/0047022 A1 | 2/2018 | Schipperheijn |
| 2018/0053157 A1 | 2/2018 | Roffey |
| 2018/0089677 A1 | 3/2018 | Ali et al. |
| 2018/0101672 A1 | 4/2018 | George |
| 2018/0160255 A1 | 6/2018 | Park |
| 2018/0181978 A1 | 6/2018 | Weinberger et al. |
| 2018/0197171 A1 | 7/2018 | Steinman et al. |
| 2018/0233001 A1 | 8/2018 | Priebatsch |
| 2018/0255460 A1 | 9/2018 | Hammad et al. |
| 2018/0285868 A1 | 10/2018 | O'Hara et al. |
| 2018/0336562 A1 | 11/2018 | Umanski et al. |
| 2019/0001732 A1 | 1/2019 | Ongsitco |
| 2019/0005494 A1 | 1/2019 | Hammad et al. |
| 2019/0066113 A1 | 2/2019 | Gupta et al. |
| 2019/0087823 A1 | 3/2019 | Patel et al. |
| 2019/0122222 A1 | 4/2019 | Uechi |
| 2019/0190717 A1 | 6/2019 | Beric et al. |
| 2019/0197553 A1 | 6/2019 | Conway |
| 2019/0332912 A1 | 10/2019 | Walker |
| 2020/0019725 A1 | 1/2020 | Rule et al. |
| 2020/0106615 A1 | 4/2020 | Rule et al. |
| 2020/0154278 A1 | 5/2020 | Douglas et al. |
| 2020/0202322 A1 | 6/2020 | Tanner et al. |
| 2020/0242588 A1 | 7/2020 | Rule et al. |
| 2020/0242616 A1 | 7/2020 | Waughtal |
| 2020/0302436 A1 | 9/2020 | Ilincic et al. |
| 2020/0304311 A1 | 9/2020 | Rule et al. |
| 2020/0314644 A1 | 10/2020 | Dean et al. |
| 2021/0004786 A1 | 1/2021 | Mossler et al. |

FOREIGN PATENT DOCUMENTS

| | | |
|---|---|---|
| WO | WO-2005/098737 A2 | 10/2005 |
| WO | WO-2005/119607 A2 | 12/2005 |
| WO | WO-2005/119608 A1 | 12/2005 |
| WO | WO-2006/023839 A2 | 3/2006 |
| WO | WO-2007/038896 A2 | 4/2007 |
| WO | WO-2007/076476 A2 | 7/2007 |
| WO | WO-2010/033944 A2 | 3/2010 |
| WO | WO-2010/127244 A2 | 11/2010 |
| WO | WO-2010/127244 A3 | 11/2010 |
| WO | WO-2012/042262 A1 | 4/2012 |
| WO | WO-2013/010096 A1 | 1/2013 |
| WO | WO-2014/170668 A1 | 10/2014 |
| WO | WO-2015/104387 A1 | 7/2015 |
| WO | WO-2016/001867 A2 | 1/2016 |
| WO | WO-2016/028779 A1 | 2/2016 |
| WO | WO-2016/049745 A1 | 4/2016 |
| WO | WO-2017/096399 A1 | 6/2017 |
| WO | WO-2017/174200 A3 | 10/2017 |
| WO | WO-2018/217106 A1 | 11/2018 |
| WO | WO-2020/122898 A1 | 6/2020 |

OTHER PUBLICATIONS

FIDO Alliance. Open Authentication Standards More Secure than Passwords. fidoalliance.org. Accessed Jul. 23, 2019.

Kadambi et al., "Near-Field Communication-Based Secure Mobile Payment Service", Proceedings of the 11th International Conference on Electronic Commerce, ACM, 2009.

Liao, Shannon. "Google will not let you use your Android phone as a physical security key." www.theverge.com/2019/4/10/18295348/google-android-phone-fido-webauthn-phishing-two-factor-authentication. Apr. 10, 2019. Accessed Jul. 23, 2019.

Liao, Shannon. "Google will now let you use your Android phone as a physical security key." www.theverge.com/2019/4/10/18295348/google-android-phone-fido-webauthn-phishing-two-factor-authentication., Apr. 10, 2019. Accessed Jul. 23, 2019.

Poroye, Adeola Oluwaseyi. "Secure contactless mobile financial services with Near Field Communication", Diss. University of the Western Cape, 2011. Located via Google Scholar, http://etd.uwc.ac.za/bitstream/handle/11394/1752/Poroye_MSC_2011.pdf?sequence=1.

Robert Triggs ("All you need to know about NFC Tags", Android Authority, Aug. 29, 2018) (Year: 2018).

Robert Triggs, "All you need to know about NFC Tags", Android Authority, Aug. 29, 2018, p. 2 (Year: 2018).

Russell, "3 Reasons Why Tap and Pay (NFC) is Awesome", Jun. 9, 2018, Heicim Articles (Year: 2018).

Russell, 3 Reasons Why 1 ap and Pay (NFC) Is Awesome, Jun. 9, 2018, Heicim Articles (Year 2018).

Triggs, R., "All You Need to Know About NFC Tags," Android Authority, Aug. 29, 2018, 6 pages.

Wong, Wen Teng. "Security of NFC payment on mobile payment application", Diss. UTAR, 2018. Located via Google Scholar, http://eprints.utar.edu.my/3050/1/fyp_CS_2018_WWT_-_1403709.pdf.

Yang, "Security Enhanced EMV-Based Mobile Payment Protocol", Hindawi Publishing Corporation, The Scientific World Journal, vol. 214, Article ID 864571, 2014, 19 pages.

SYSTEMS AND METHODS FOR MOBILE WALLET PROVISIONING

CROSS-REFERENCE TO RELATED APPLICATIONS

This application is a continuation of U.S. patent application Ser. No. 15/370,095 titled "SYSTEMS AND METHODS FOR MOBILE WALLET PROVISIONING," filed Dec. 6, 2016, which is a continuation of U.S. patent application Ser. No. 15/255,880, titled "SYSTEMS AND METHODS FOR MOBILE WALLET PROVISIONING," filed on Sep. 2, 2016, which claims priority to U.S. Provisional Patent Application No. 62/326,676, entitled "SYSTEMS AND METHODS FOR MOBILE WALLET PROVISIONING," filed on Apr. 22, 2016, all of which are herein incorporated by reference in their entireties and for all purposes.

BACKGROUND

Many financial institution customers are able to complete various financial transactions through their mobile computing devices. The customers may set up their mobile devices to organize and selectively exchange payment information with transaction terminals, and with each other, in the absence of physical payment cards. Payment information may be managed by various software programs, including "mobile wallets" offered by mobile device manufacturers, financial institutions or other third party software developers. To exchange payment information, many mobile wallets utilize payment tokens, which are surrogate values that replace a user's (e.g., cardholder's) primary account number ("PAN") associated with a payment card, such as a credit card, debit card, stored value card, etc.

SUMMARY

One embodiment of the present disclosure relates to a method for provisioning a payment account to a mobile wallet includes receiving a request to provision a payment token configured to facilitate a mobile wallet transaction. The method includes receiving a payment account configured for provision to a mobile wallet, generating the payment token responsive to the request to provision the payment token, associating the payment token with the payment account, receiving account information for a payment account, receiving address information from a mobile device associated with the mobile wallet, the address information uniquely identifying the mobile wallet, and provisioning the payment token associated with the payment account to the mobile wallet responsive to receiving the address information and the account information.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

DETAILED DESCRIPTION

Various embodiments discussed herein relate to systems and methods for provisioning payment accounts to a mobile wallet implemented on a mobile device. In some embodiments, provisioning is initiated from a physical channel (i.e., an initiating device) that is separate and distinct from the mobile device associated with the mobile wallet. For example, a user may initiate provisioning of a payment account to the mobile wallet from an automated teller machine (ATM), a customer interface located at a branch location of a financial institution, or a user personal computing device (e.g., desktop computer, laptop, etc.) other than the associated mobile device. For example, a user may sign up for a credit card account at a branch location of the financial institution. After the credit card has been approved, the banker may ask the user if the user would like for the new credit card to be provisioned to the user's mobile wallet. Upon agreement from the user, the banker may initiate provisioning from a banker computer used by the banker, such that the user does not need to open the mobile wallet application and initiate the provisioning from within the mobile wallet. As another example, the user may be prompted at the ATM whether the user would like for a credit card to be provisioned to the user's mobile wallet. Because the provisioning is initiated from the banker computer or from the ATM, the user does not need to re-enter credit card information from within the mobile wallet application. Hence, the provisioning process requires fewer steps to be performed by the user on the user's mobile device.

As an example, the mobile wallet user may initiate (e.g., via an NFC tap) a communication event between the initiating device (e.g., the banker computer, the ATM, etc.) and the user's mobile device. As part of the communication event, the user's device transmits a return address for the provisioned account. The return address is the address of the user's mobile device and provides the token service provider with address information useable to return a token for the provisioned account back to the user's mobile device. A provisioning request is sent to the token service provider that includes the return address as well as an identification of the source payment account to be provisioned. The source account may be selected via the initiating device (e.g., the banker using the bank computer) or via the mobile device (e.g., the user using an online banking application). The token service provider provisions a payment token for the selected payment account, then sends the token to the mobile wallet at the return address of the user mobile device.

Figure 1:
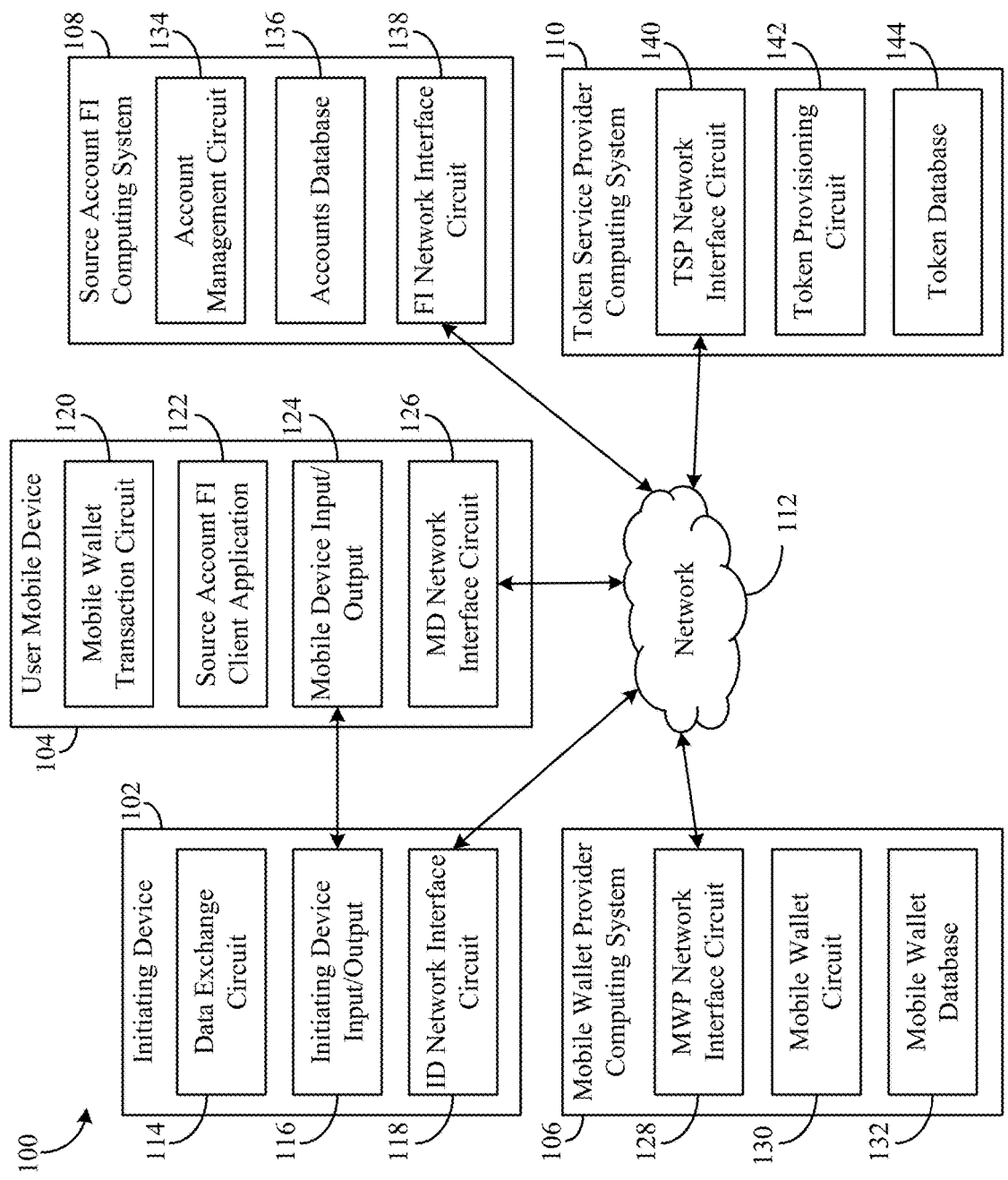
FIG. 1 is a schematic diagram of a mobile payment provisioning system, according to an example embodiment.

Referring to FIG. 1, a block diagram of a computer-implemented mobile payment provisioning system 100 is shown, according to an example embodiment. The mobile payment provisioning system 100 is used to provision a token for a payment account (e.g., credit card account, checking account, etc.) to a mobile wallet. The mobile payment provisioning system 100 may include, among other devices and systems, an initiating device 102, a user mobile device 104, a mobile wallet provider computing system 106, a source account financial institution (FI) computing system 108, and a token service provider computing system 110. The various systems and devices may communicate through a network 112, which may include one or more of the Internet, cellular network, Wi-Fi, Wi-Max, a proprietary banking network, or any other type of wired or wireless network.

The initiating device 102 is a device that enables a user of the mobile wallet to initiate provisioning of a source payment account to the mobile wallet. The initiating device 102 may be any device that is able to perform the functions ascribed to the device 102 herein, but in various embodiments is separate and distinct from the user mobile device 104 (i.e., the mobile device associated with the user's mobile wallet). In some embodiments, the initiating device 102 is operated by the source account FI computing system 108 (e.g., the provider of the source payment account), enabling the user to communicate with the source account FI computing system 108 using the initiating device 102. For example, the initiating device 102 may include an automated teller machine (ATM) operated by the source financial institution, or a user interface located at a branch location of the source financial institution. As another example, the initiating device 102 may be a banker computing device used by a banker in a branch location. As another example, the initiating device 102 may include a desktop/laptop computing device having a web browser configured to communicate with the source account FI computing system 108. For example, the user may initiate provisioning of the token to the mobile device 104 while using a different computer, e.g., a laptop computer, during an online banking session at an online banking website provided by the source account FI computing system 108.

The initiating device 102 includes a data exchange circuit 114, an initiating device input/output (I/O) 116, and an initiating device network interface circuit 118. The initiating device network interface circuit 118 enables the initiating device 102 and the various components therein to exchange data over the network 112 (e.g., with the user mobile device 104, the source account FI computing system 108, the mobile wallet provider computing system 106, the token service provider computing system 110, etc.).

The data exchange circuit 114 is configured to exchange data among the initiating device I/O 116 and the entities of the system 100 to perform the operations attributed to the initiating device 102 herein. In an example embodiment, the data exchange circuit 114 facilitates the exchange of data required to initiate provisioning of a payment account to a user's mobile wallet (e.g., to the mobile device 104). For example, the data exchange circuit 114 may be configured to receive information from the mobile wallet user (e.g., authentication information, information relating to the user's payment account, mobile wallet provider, etc.) via the initiating device I/O 116. The data exchange circuit 114 is also configured to receive information (e.g., mobile wallet address information) from the user mobile device 104. The data exchange circuit 114 may then send the information to the source account FI computing system 108 over the network 112 (e.g., via the network interface circuit 118) in order to initiate provisioning of the payment account to the mobile wallet.

The initiating device I/O 116 includes one or more devices and associated logics configured to allow a user to exchange information and interact with the data exchange circuit 114. For example, an input aspect of the initiating device I/O 116 can include a keyboard, a touchscreen, a payment card magstripe reader, a payment card chip reader, a microphone, a camera, a fingerprint scanner, any user input device engageable to the initiating device 102 via a USB, serial cable, and so on. In turn, an output aspect of the initiating device I/O 116 can include a digital display, a speaker, illuminating icons, LEDs, a paper (e.g., receipts) dispenser, and so on. In addition, in some embodiments the input aspect and the output aspect of the initiating device I/O 116 include a contactless data transmission service. In these embodiments, the contactless transmission device may include hardware and associated software sufficient to enable the initiating device 102 to wirelessly and securely exchange data over short distances. For instance, the contactless transmission device may be used to wirelessly receive an identifier (e.g., device identifier, user identifier, wallet identifier, etc.) from the user mobile device 104. In some arrangements, the contactless device is configured to use RFID to exchange digital information. In some such arrangements, the contactless device enables the initiating device 102 to exchange data over a radio frequency range required for NFC. As such, the initiating device I/O 116 can wirelessly send and receive data at a local level (i.e., where the user mobile device 104 is physically present at the initiating device 102).

The user mobile device 104 is a mobile device held by the mobile wallet user and associated with the user's mobile wallet account. The user's mobile wallet account is implemented on the user mobile device 104, enabling the user to access a provisioned payment account via the mobile device 104 to provide payments to merchants or other users. The user mobile device 104 may include one or more of a smartphone or other cellular device, a wearable computing device (e.g., eyewear, a watch, etc.), a tablet, and so on. The mobile device 104 may also include any other portable device upon which a mobile wallet may be implemented.

The user mobile device 104 includes a mobile wallet transaction circuit 120, a source account financial institution (FI) client application 122, a mobile device input/output (I/O) 124, and a mobile device network interface circuit 126. The mobile device network interface circuit 126 is similar to the network interface circuit 118, enabling the mobile device 104 to exchange data with remote computing devices over the network 112, including with other entities of the system 100. As an example, the network interface circuit 126 allows the mobile device 104 to exchange data with the mobile wallet provider computing system 106, including as part of a mobile wallet payment.

The mobile device I/O 124 includes hardware and associated logics that enable the mobile wallet user and the initiating device 102 to exchange information with the user mobile device 104. An input aspect of the mobile device I/O 124 allows the user to provide information to the mobile device 104, and can include, for example, a keyboard, a touchscreen, a microphone, a camera, a fingerprint scanner, any user input device engageable to the mobile device 104 via USB, and so on. In turn, an output aspect of the mobile device I/O 124 allows the user to receive information from the mobile device 104, and can include, for example, a digital display, a speaker, illuminating icons, LEDs, and so on. In an example embodiment, the mobile device I/O 124 also includes a contactless data transmission device that operates in a manner similar to and compatible with the initiating device I/O 116. For example, the mobile device I/O 124 may be configured to communicate with the initiating device 102 to remotely send mobile wallet address information.

The mobile wallet transaction circuit 120 facilitates operation of a mobile wallet, which the mobile wallet user (e.g., a business owner or employee, a consumer, etc.) may utilize to conduct payment transactions. The mobile wallet transaction circuit 120 may be used by the user to implement and interact with the user's mobile wallet account. In some embodiments, the mobile wallet transaction circuit 120 includes software, such as a mobile application, configured to communicate with the mobile wallet provider computing system 106 via the network 112. Such software may be issued by or on behalf of the mobile wallet provider computing system 106, which may be operated by the source account financial institution or a third party wallet provider (e.g., Apple Pay, Samsung Pay, etc.). In an example embodiment, the mobile wallet provider computing system 106 provides the software application for download (e.g., via a website associated with the mobile wallet provider computing system 106, via an app store, etc.). Responsive to a user selection of an appropriate link or other action, the mobile wallet application is transmitted to the mobile device 104 and may cause itself to be installed on the mobile device 104. Installation of the software application creates the mobile wallet transaction circuit 120 on the mobile device 104. Specifically, after installation, the thus-modified mobile device 104 includes the mobile wallet transaction circuit 120 (embodied as a processor and instructions stored in non-transitory memory that are executed by the processor). As will be appreciated, the level of functionality that resides on the mobile device 104 as opposed to the mobile wallet provider computing system 106 may vary depending on the implementation.

The mobile wallet transaction circuit 120 may also be configured to communicate with the initiating device 102, as well as devices of merchants and other users, either directly or over the network 112. For instance, the mobile wallet transaction circuit 120 may communicate wirelessly with the initiating device 102 (or another device) through the network interface circuit 126 via a wireless communication protocol, such as to communicate information required to provision a payment account. The mobile wallet transaction circuit 120 may also communicate information by presenting a barcode (e.g., a two-dimensional or three-dimensional barcode) on the mobile device I/O 124 (e.g., display) that may be scanned by a scanner of a receiving device (e.g., the initiating device 102, a merchant POS device, another user device, etc.). For instance, the user mobile device 104 may provide mobile wallet address information to the initiating device 102 using such a barcode.

While setting up a mobile wallet account, the mobile wallet transaction circuit 120 may receive, organize, and store payment tokens associated with the user's payment account(s). The payment tokens may be received from the mobile wallet provider computing system 106, the token service provider computing system 110, or another entity of system 100. In some embodiments, the payment tokens are generated by the token service provider computing system 110 in response to a request received from the user via the initiating device 102. The mobile wallet transaction circuit 120 is configured to transmit certain payment tokens to merchants and other users (e.g., via the mobile device I/O 124) as part of any of a variety of transaction requests to complete various financial operations. In various embodiments, the mobile wallet transaction circuit 120 may also receive and display screens on the mobile device I/O 124 including account information, transaction instructions, and so on. In one embodiment, a screen may be used to request authentication credentials from the user, provide payment and transaction information, and so on.

In some embodiments, the mobile wallet transaction circuit 120 includes a memory device that is unique to the user mobile device 104, such as a secure element. The secure element may be a tamper-resistant circuit (e.g., a one chip secure microcontroller) capable of securely hosting applications and confidential and cryptographic data (e.g., key management) associated therewith. The unique memory device may be used to store and organize the payment tokens associated with the mobile wallet. The mobile wallet transaction circuit 120 may also be used to store identifiers for the user mobile device 104, the user's mobile wallet, and/or the user. In some embodiments, the mobile wallet transaction circuit 120 is configured to extract, encrypt, and communicate these unique identifiers as address information for the user's mobile wallet account. For instance, the address information may be communicated to the initiating device 102 and/or the source account FI computing system 108 as part of a provisioning request. The address information is then forwarded to the token service provider as a return address for the provisioned payment token(s).

The source account FI client application 122 facilitates communication with the source account financial institution (e.g., the source account FI computing system 108). In an example embodiment, the source account FI client application 122 includes a mobile banking application that enables the mobile wallet user to manage payment accounts held by the user and provided by the source account FI computing system 108. In this embodiment, the client application 122 may provide displays indicative of current payment account balances, authentication requirements, profile information, account limits, and the like. In some embodiments, the client application 122 enables the mobile wallet user to initiate provisioning of one or more of the payment accounts to a mobile wallet provided by a third party. For instance, the client application 122 may enable the user to select a source payment account for the mobile wallet, and to provide any other information required to initiate provisioning. The client application 122 may also send return address information from the mobile device 104 to the source account FI computing system 108.

In an example embodiment, the source account FI computing system 108 provides the mobile banking application for download (e.g., via a website associated with the source account FI computing system 108, via an app store, etc.). Responsive to a user selection of an appropriate link or other action, the mobile banking application is transmitted to the mobile device 104 and may cause itself to be installed on the mobile device 104. As will be appreciated, the level of functionality that resides on the mobile device 104 as opposed to the source account FI computing system 108 may vary depending on the implementation.

The mobile wallet provider computing system 106 is operated by a mobile wallet provider that maintains and handles transaction processing for a mobile wallet account held by the user. In some embodiments, the mobile wallet provider computing system 106 is operated by the source account FI computing system 108 (e.g., the source financial institution), with the user's source payment account and the mobile wallet account both being provided by the mobile wallet provider (i.e., the source financial institution). In other embodiments, the mobile wallet provider computing system 106 is operated by a third party wallet provider (e.g., Apple Pay, Samsung Pay, etc.) that manages the mobile wallet account on behalf of the user, with the mobile wallet account being funded by a source payment account provided by a separate financial institution (i.e., the source account FI computing system 108). In these embodiments, the mobile wallet provider is separate and distinct from the source financial institution.

The mobile wallet provider computing system 106 includes a mobile wallet provider network interface circuit 128, a mobile wallet circuit 130, and a mobile wallet database 132. The mobile wallet provider network interface circuit 128 enables the mobile wallet provider computing system 106 to exchange data with remote computing devices over the network 112, including with other entities of the system 100. The mobile wallet circuit 130 enables or otherwise supplements the functionality of the mobile wallet on the mobile device 104. In some embodiments, the mobile wallet transaction circuit 120, including any associated user interfaces, displays, and associated content, is provided and/or operated by the mobile wallet circuit 130. For instance, the mobile wallet transaction circuit 120 may be downloaded to the mobile device 104 based on content provided by the mobile wallet circuit 130. The mobile wallet database 132 stores information regarding mobile wallet accounts held by various users, including for a mobile wallet account held by the user of the mobile device 104. The stored mobile wallet account information may include authentication information (e.g., username/password combinations, device authentication tokens, security question answers, etc.), payment card information, transaction history, account holder identifying information, and any other information that may be encountered in the operation of a mobile wallet account or otherwise referenced herein.

The source account financial institution (FI) computing system 108 is operated by a financial institution that provides one or more payment accounts (e.g., demand deposit account, credit card account, etc.) to the user, including a source payment account for the user's mobile wallet. In an example embodiment, the source account FI computing system 108 operates the initiating device 102, such that the initiating device 102 facilitates communication between the mobile wallet user and the source account FI computing system 108. In these embodiments, the source account FI computing system 108 utilizes information received by the initiating device 102 to initiate provisioning of a payment account to the user's mobile wallet (e.g., to the mobile device 104). The source account FI computing system 108 is configured to receive the information via the initiating device 102, then route the information as a provisioning request to a token service provider.

The source account FI computing system 108 includes an account management circuit 134, an accounts database 136, and an FI network interface circuit 138. The account management circuit 134 is structured to manage financial accounts (e.g., demand deposit accounts, credit or debit card accounts, brokerage accounts, etc.) of various users. Information regarding the users' financial accounts is stored in the accounts database 136. For example, financial account information may include user authentication information (e.g., username/password combinations, device authentication tokens, security question answers, etc.), account balances, transaction history, etc. The account information may also include any other information that is required to provision a payment token based on a payment account, including account numbers, expiration dates for payment cards, etc. Similar to the other network interface circuits described herein, the FI network interface circuit 138 enables the source account FI computing system 108 to exchange data with remote computing devices over the network 112, including with other entities of the mobile payment provisioning system 100.

The token service provider (TSP) computing system 110 is operated by a token service provider, which may include a credit card network or other type of payment system, an acquiring or issuing financial institution (e.g., source account FI computing system 108), a mobile wallet provider (e.g., mobile wallet provider computing system 106), or another token service provider. The TSP computing system 110 is configured to provision payment credentials (e.g., payment tokens) on behalf of the mobile wallet user in response to a provisioning request initiated using the initiating device 102 (or by another channel described herein).

The TSP computing system 110 includes a token service provider network interface circuit 140, a token provisioning circuit 142, and a token database 144. The TSP network interface circuit 140 enables the token service provider computing system 110 to exchange data with remote computing devices over the network 112, including with other entities of the mobile payment provisioning system 100. The token database 144 is a storage medium retrievably storing token information (e.g., a token vault), and may include non-transient data storage mediums (e.g., local disc or flash-based hard drives, local network servers, and the like) or remote data storage facilities (e.g., cloud servers).

The token provisioning circuit 142 may be used to facilitate various services associated with tokens, including provisioning (e.g., generating) new tokens, authorizing a token for use in a financial transaction, storing payment account tokens (e.g., in the token database 144), and managing the life cycles of the payment account tokens. The token provisioning circuit 142 is configured to exchange information with the token database 144, and with remote systems over the network 112 via the network interface circuit 140.

The token provisioning circuit 142 is structured to provision a payment token, which may include generating the payment token itself and linking the payment token to a payment account. The payment token is intended to replace sensitive information related to the payment account, such as an account number (e.g., a sixteen-digit account number for a payment card associated with the account) or other original account information. Once generated, a given payment token may be used to execute a transaction rather than exchanging the sensitive account information. For instance, a customer may request provisioning of a payment token from the token provisioning circuit 142 over the network 112 (e.g., using the initiating device 102) in order to conduct a mobile wallet transaction using a selected payment account.

In an example embodiment, the initiating device 102 (e.g., a banker computer, an ATM, a laptop computer associated with the user, etc.) initiates provisioning of a payment token for the source account (e.g., to the mobile device 104, to the user's mobile wallet account). In this embodiment, the source account has an assigned PAN specifically identifying the source account (e.g., a sixteen-digit account number for a payment card associated with the account). Upon initiation, the source account FI computing system 108 routes a request to the TSP computing system 110 (e.g., directly, via the mobile wallet provider, etc.) to provision a payment token for a selected source payment account. The request may include the PAN identifying the source account. Upon receipt of the request, the TSP computing system 110 (i.e., the token provisioning circuit 142) generates a payment token based on the source account (e.g., a device primary account number, or DPAN), assigning the payment token to the corresponding PAN. The provisioned payment token enables the user to access funds from the source account using the mobile device 104. In some embodiments, the payment token (e.g., the DPAN) is stored directly on the mobile device 104 (e.g., the mobile wallet transaction circuit 120, a secure element), identifying the corresponding source account and enabling the mobile device 104 to transact using the source account. In some embodiments, the payment token is stored at the mobile wallet provider computing system 106. The PAN, the payment token, and information relating to their respective associations may be stored in the token database 144, and in some arrangements, the mobile wallet database 132.

The payment token generated by the token provisioning circuit 142 may be any type of digital token or code suitable for use as a payment credential, such as a numerical code, an alphanumeric code, a collection of abstract characters, and so on. In some arrangements, the token is a unique digital tag associated with sensitive information that can be interpreted by an authorized computing system (e.g., the token provisioning circuit 142 can identify a given token, and retrieve the token's corresponding information from the token database 144). In some embodiments, the payment token is a tokenized sixteen digit number. For instance, where the source payment account is a credit or debit card account, the tokenized sixteen digit number may be used as a payment credential in place of the original sixteen digit number of the credit or debit card. In this embodiment, the payment card token may have a unique BIN (e.g., the first four digits of the original card number), but retains the same last four digits as the original card number in order to accurately match the payment card token to the account holder (i.e., the payment card owner). The remaining numbers may be generated by the token provisioning circuit 142 using various tokenization or encryption algorithms. In some arrangements, the token is an encrypted copy of sensitive information itself (e.g., an encrypted charge account number).

The mobile wallet provider computing system 106, the source account FI computing system 108, and the token service provider computing system 110 may each include a computing system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and/or non-transitory computer storage media. The memory may include data base components, object code components, script components, or any other type of information structure for supporting the various activities and information structures described herein. The memory may be communicably connected to the processor and include computer code or instructions for executing one or more processes described herein. The mobile wallet provider computing system 106, the source account FI computing system 108, and the token service provider computing system 110 may each include server-based computing systems, for example, comprising one or more networked computer servers that are programmed to perform the operations described herein. In another example, the mobile wallet provider computing system 106, the source account FI computing system 108, and the token service provider computing system 110 may each be implemented as a distributed computing system where each function is spread over multiple computing systems.

Figure 2:
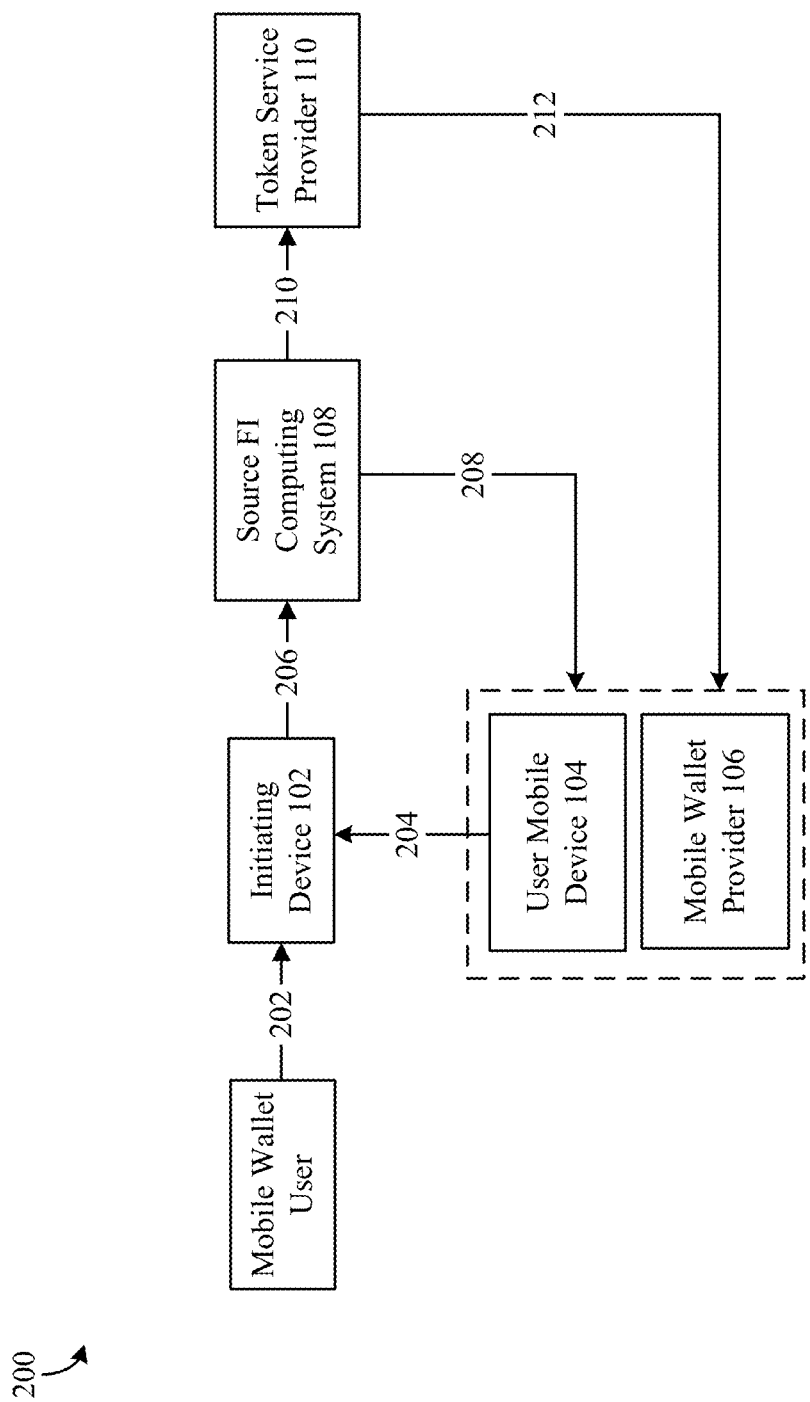
FIG. 2 is a schematic flow diagram of a process for provisioning a payment account to a mobile wallet using the system of FIG. 1, according to an example embodiment.

Referring now to FIG. 2, process 200 is shown for provisioning a payment account to a mobile wallet, according to an example embodiment. The process 200 may be performed using the mobile payment provisioning system 100 shown in FIG. 1, including one or more of the initiating device 102, the user mobile device 104, the mobile wallet provider computing system 106, the source account FI computing system 108, and the token service provider computing system 110. According to process 200, provisioning of a source payment account is initiated using a device (i.e., the initiating device 102, e.g., a banker computer, an ATM, etc.) that is separate and distinct from the user's mobile device (i.e., the mobile device associated with the user's mobile wallet account). The initiating device 102 is described with regard to process 200 as being operated by the financial institution provider of the source payment account (e.g., source account FI computing system 108). However, it should be noted that in other embodiments the initiating device 102 may be operated and/or provided by another entity, including any other entity of the mobile payment provisioning system 100.

At 202 of the process 200, the initiating device 102 receives a request to provision a source payment account to the user's mobile wallet. The banker/user may initiate provisioning of the source payment account using an interface provided at the initiating device 102. The interface may be displayed to the banker/user, and the banker/user may provide input, using the initiating device I/O 116 of the initiating device 102. In an example embodiment, the interface is generated and provided by the source account FI computing system 108, enabling communication between the user and the source account FI computing system 108. For instance, the initiating device 102 may include an ATM associated with the source account FI computing system 108, an NFC device located at a branch location of the source financial institution, or another customer interface configured to communicate with the mobile wallet user.

In some embodiments, the user is required to authenticate to the initiating device 102 (e.g., the user interface) in order to initiate provisioning of the payment account (e.g., to submit a provisioning request). For instance, where the initiating device 102 is operated by the source account FI computing system 108 (e.g., an ATM), the user may be required to provide authentication credentials associated with the source financial institution, including one or more of a payment card, user name, password or PIN, and the like. In other embodiments, the authentication credentials may be related to the user's mobile wallet account, or other authentication credentials associated with the user and available for verification by the initiating device 102 (or the source account FI computing system 108). Once authenticated, the user may be provided with sensitive account information associated with the user, including a user interface providing a listing of payment accounts available for provisioning to the user's mobile wallet.

As part of the provisioning request, the banker/user selects a source payment account. In some embodiments, the initiating device 102 provides a display (e.g., via the user interface) of one or more payment accounts associated with the user and eligible for provisioning to a mobile wallet account. For instance, the source account FI computing system 108 may retrieve the user's account information from the accounts database 136, then display the available payment accounts to the user by the initiating device 102.

Account information for the user may be retrieved based on information (e.g., authentication information) received from the user. The banker/user may then select a desired source account from those displayed. In some embodiments, the banker/user may indicate a source account that is not displayed by providing information associated with the source account (e.g., an account number, associated financial institution, associated person(s), user name, account type, etc.). The source account FI computing system 108 may then determine the source account (e.g., locate in the accounts database 136) based on the information provided. In some embodiments, the source account FI computing system 108 is able to identify a payment account provided by another financial institution, for instance, using the information provided. Once the source account is identified, the initiating device 102 (e.g., the source account FI computing system 108) may provide the banker/user with a link or other option that the user can select to initiate provisioning of the account.

The provisioning request may also include information related to the user's mobile wallet, including the mobile wallet provider (e.g., mobile wallet provider computing system 106). For instance, the banker/user may provide an identifier associated with the mobile wallet provider, mobile wallet account, device, and/or the user in order to identify the provider associated with the mobile wallet account. Similar to the source payment account, the source account FI computing system 108 may provide a display of several mobile wallet providers for selection by the banker/user.

At 204, the initiating device 102 receives address information associated with the user's mobile wallet. The address information includes a return address for the provisioned payment token, enabling a token service provider (or another provisioning entity) to locate (e.g., identify) the user's mobile wallet account, and to provision the payment account (e.g., the payment token) to the correct mobile wallet (i.e., the mobile wallet account held by the user). In an example embodiment, the address information is received from the mobile device 104. The address information may include a return address that is uniquely associated with the mobile device 104, such as a device identifier (e.g., SDiD). The return address provides location information for the mobile device 104, which may include a location for storing a provisioned payment token associated with the source payment account. In some embodiments, the user is prompted (e.g., by the source account FI computing system 108, by the mobile wallet provider) to facilitate communication of the address information upon initiating provisioning at the initiating device 102. The source account FI computing system 108 (or another associated entity) may prompt the user by sending a message via the initiating device 102 and/or the mobile device 104 (e.g., the source account FI client application 122). For instance, the user may be prompted to initiate a communication event between the mobile device 104 and the initiating device 102, including by causing the mobile device 104 to broadcast the address information, or by placing the mobile device 104 within range of a wireless reader of the initiating device 102.

In some embodiments, the mobile device 104 (e.g., the mobile wallet transaction circuit 120, the source account FI client application 122, etc.) enables the user to wirelessly transmit the address information to a nearby device. For instance, the mobile device 104 may be configured to, upon initiation by the user, extract the address information from the mobile device 104 (e.g., from a secure element or other memory device), encrypt the address information, and broadcast the encrypted address information (e.g., via NFC, Bluetooth, WiFi, infrared (IR), satellite, or other wireless transmission) to a nearby device. In some embodiments, the broadcast has a limited range (e.g., one or two feet), such that the user is required to bring the mobile device 104 within vicinity of the initiating device 102 to exchange the information. In other embodiments, the initiating device 102 may receive address information from the mobile wallet provider computing system 106, including identifiers relating to the mobile wallet account, the mobile wallet provider, and/or the user. Similar to address information from the mobile device 104, address information received from the mobile wallet provider computing system 106 may be extracted and encrypted prior to sending to the initiating device 102.

At 206, the source account FI computing system 108 receives the provisioning request, including the payment account selection and the encrypted address information, from the initiating device 102. Based on the payment account selection, the source account FI computing system 108 retrieves information related to the selected payment account from the accounts database 136. The retrieved information includes any information that is required to provision the account to the user's mobile wallet (i.e., the source payment account information), which may include an account number, identification of the source financial institution and the user, and so on.

At 208, the source account FI computing system 108 sends a message to the mobile wallet provider computing system 106, notifying the mobile wallet provider computing system 106 that a provisioning request has been received for a mobile wallet provided by the system 106. The message may be sent before or after sending the provisioning request to a token service provider (e.g., the TSP computing system 110). The message may include any of the information received from the initiating device 102, including identification of the user, the address information, or any other relevant information. The message may also include identification of the TSP computing system 110 (i.e., the token service provider), including an indication that a payment token will be transmitted by the TSP computing system 110 for receipt by the mobile wallet provider computing system 106.

In some embodiments, the source account FI computing system 108 also receives information from the mobile wallet provider computing system 106. As an example, the mobile wallet provider computing system 106 may provide address information (e.g., location information, a return address, a mobile wallet identifier) related to the mobile wallet of the user, e.g., instead of such information being provided by the mobile device 104. The information received from the mobile wallet provider computing system 106 may enable a token service provider to send a provisioned payment token to the correct mobile wallet account (i.e., store the payment token in the correct mobile wallet).

At 210, the source account FI computing system 108 sends the source payment account information, information from the mobile device 104, and/or information received from the mobile wallet provider computing system 106 to a token service provider (e.g., token service provider computing system 110). At 212, the TSP computing system 110 provisions a payment token based on the source payment account. The payment token is provisioned to the mobile wallet of the user, enabling the user to access funds from the source payment account using the user mobile device 104. The payment token is provisioned based on the source payment account information. The payment token may be provisioned by tokenizing the payment account information, as is otherwise described herein. Once provisioned, the payment token is associated with (e.g., assigned to) the source payment account and stored in a database of the TSP computing system 110 (e.g., token database 144).

The TSP computing system 110 also sends the payment token to the mobile device 104 via the mobile wallet provider computing system 106 at 212. The network location of the mobile wallet (i.e., the return address) is determined based on the address information provided as part of the provisioning request. The location may include an identifier associated with the mobile device 104, the mobile wallet account, and/or the user. In an example embodiment, the TSP computing system 110 sends the payment token to the mobile wallet provider computing system 106. The mobile wallet provider computing system 106 then sends the payment token to the mobile device 104 based on the return address provided by the user mobile device 104 (i.e., to the initiating device 102). The payment token is then stored on the mobile device 104 for use in accessing funds from the source payment account. For instance, the payment token may be stored on a secure element that is unique to the mobile device 104. The payment token may then be accessed (e.g., by the mobile wallet transaction circuit 120) to execute a transaction to or from the source payment account using the mobile device 104. In other embodiments, the payment token is stored solely at the mobile wallet provider computing system 106 and pulled (e.g., by the mobile wallet transaction circuit 120) in order to execute a transaction using the mobile device 104. In these embodiments, the address information includes identification of a mobile wallet account stored at the mobile wallet provider computing system 106.

Figure 3:
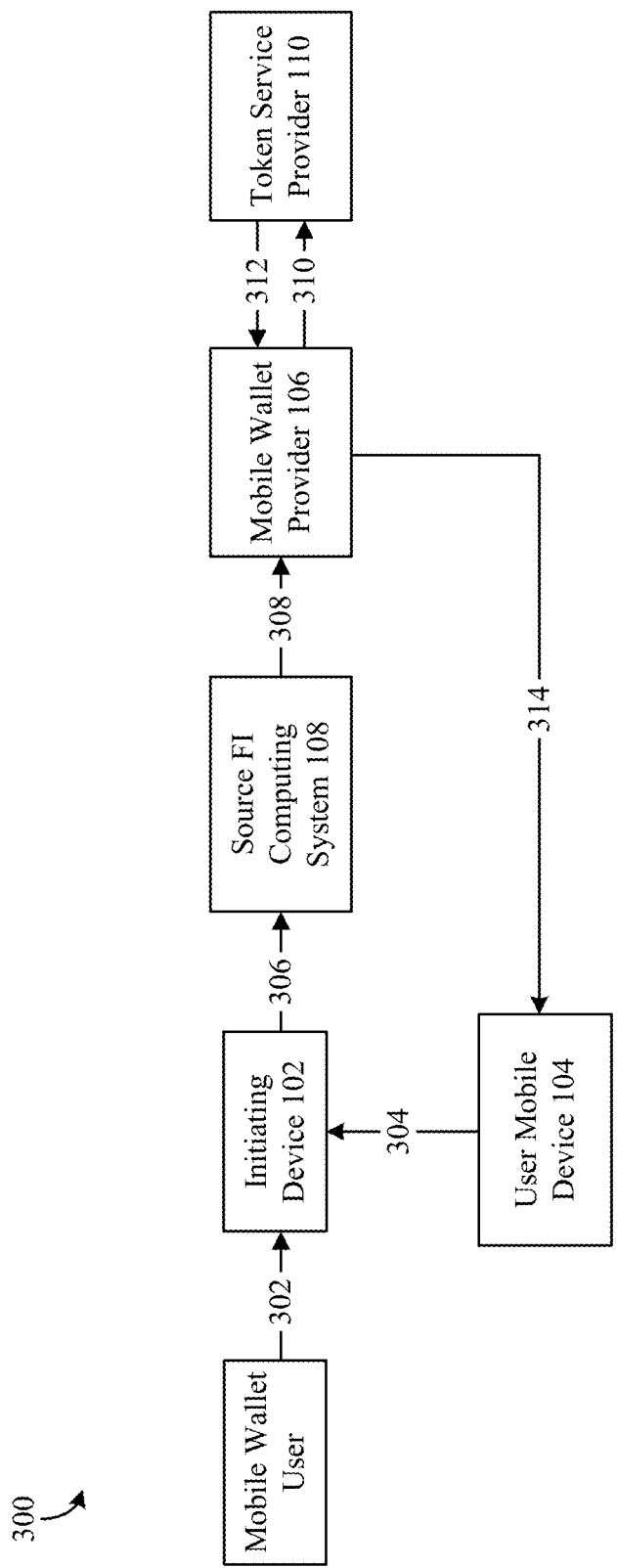
FIG. 3 is a schematic flow diagram of a process for provisioning a payment account to a mobile wallet using the system of FIG. 1, according to another example embodiment.

Referring now to FIG. 3, process 300 is shown for provisioning a payment account to a mobile wallet, according to another example embodiment. In the example of FIG. 3, the provisioning request is sent by the mobile wallet provider computing system 106 to the token service provider computing system 110 (instead of being sent by the source account FI computing system 108, as in the example of FIG. 2).

The process 300 may be performed using the mobile payment provisioning system 100 shown in FIG. 1. Steps 302-306 are similar to steps 202-206 of process 200, and any description relating to steps 202-206 may be applied accordingly to steps 302-306. At 302, the mobile wallet user initiates provisioning of a payment account to the user's mobile wallet using the initiating device 102. At 304, the initiating device 102 receives address information from the user mobile device 104, including a return address for sending the provisioned payment account. At 306, the source account FI computing system 108 receives the provisioning request, including a payment account selection and mobile wallet address information, from the initiating device 102.

At 308, the source account FI computing system 108 sends the source payment account information and the mobile wallet address information to the mobile wallet provider (e.g., the mobile wallet provider computing system 106) as part of a provisioning request. In some embodiments, the source account FI computing system 108 determines the identity of the mobile wallet provider based on information received from the mobile wallet user. For instance, the banker or the mobile wallet user may identify the mobile wallet provider at the initiating device 102. The source account FI computing system 108 may also determine the mobile wallet provider based on the mobile wallet address information received from the user mobile device 104.

Upon receiving the request, the mobile wallet provider computing system 106 may request confirmation of the request from the mobile wallet user (e.g., via the user mobile device 104), including verification of the payment account information. The mobile wallet provider computing system 106 may also request verification of the payment account information from the source account FI computing system 108. The mobile wallet provider computing system 106 may also verify the mobile wallet address information by sending a communication to the user mobile device 104 (i.e., using the mobile wallet address information).

At 310, the mobile wallet provider computing system 106 sends the provisioning request (i.e., the payment account information and the mobile wallet address information) to a token service provider (e.g., the TSP computing system 110). In some embodiments, the mobile wallet provider computing system 106 notifies the mobile wallet user that the provisioning request has been sent, such as by sending a message to the user mobile device 104.

At 312, the TSP computing system 110 provisions a payment token and sends the provisioned payment token to the mobile wallet provider computing system 106. The payment token is provisioned based on the source payment account, replacing sensitive account information with a unique identifier that cannot be mathematically reversed. The payment token may be associated with (e.g., assigned to) the source payment account and stored in a database of the TSP computing system 110 (e.g., token database 144).

At 314, the mobile wallet provider computing system 106 sends the provisioned payment token to the user mobile device 104. The user mobile device 104 is identified (e.g., located in a network) based on the return address provided by the user mobile device 104 at step 304. In an example embodiment, the payment token is stored on the user mobile device 104. For instance, the payment token may be stored on a memory device (e.g., a secure element) that is unique to the mobile device 104. The payment token may then be accessed (e.g., by the mobile wallet transaction circuit 120) to execute a transaction to or from the source payment account using the mobile device 104. The payment token is also stored at the mobile wallet provider computing system 106. In some embodiments, the payment token is stored solely at the mobile wallet provider computing system 106 and pulled (e.g., by the mobile wallet transaction circuit 120) in order to execute a transaction using the mobile device 104. In these embodiments, the address information includes identification of a mobile wallet account stored at the mobile wallet provider computing system 106.

Figure 4:
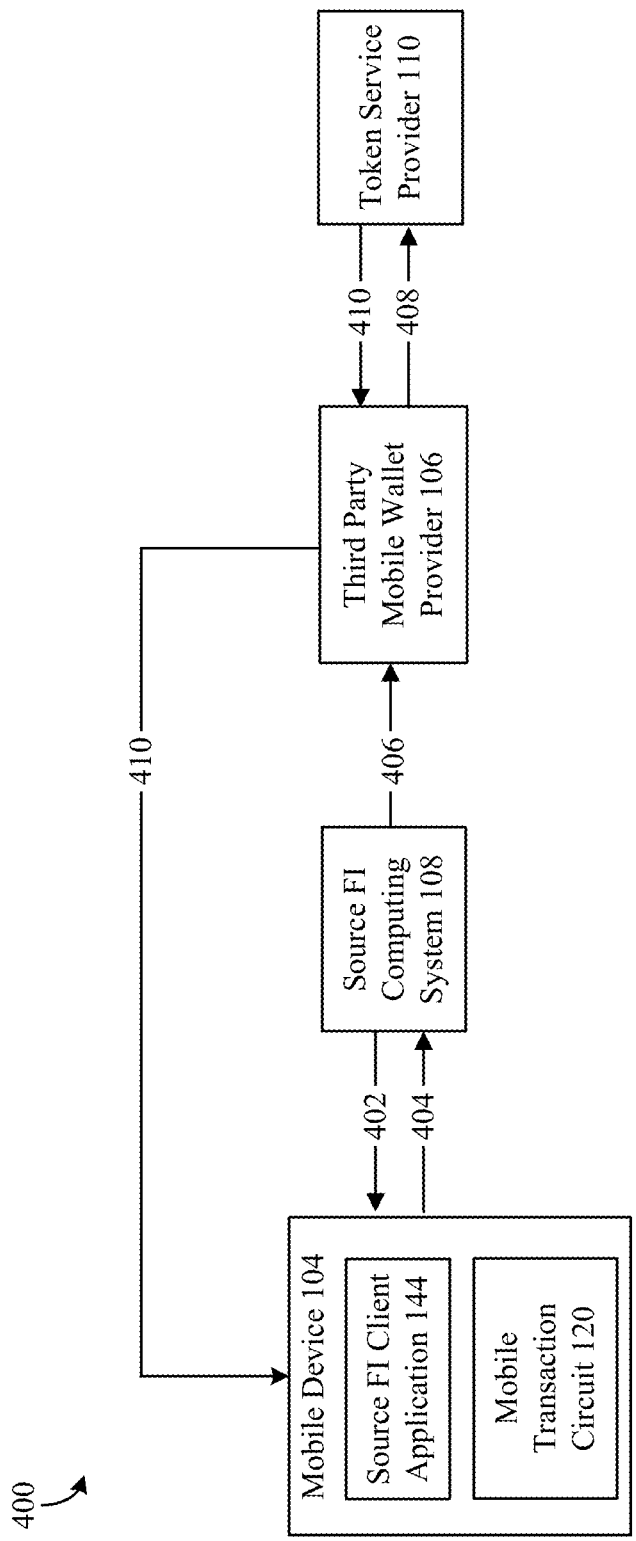
FIG. 4 is a schematic flow diagram of a process for provisioning a payment account to a mobile wallet using the system of FIG. 1, according to another example embodiment.

Referring now to FIG. 4, process 400 is shown for provisioning a payment account to a mobile wallet, according to another example embodiment. According to process 400, a user of a third party mobile wallet initiates provisioning of a source payment account using a mobile banking application provided by a source account financial institution (e.g., the provider of the source payment account, the source account FI computing system 108). Hence, provisioning is initiated using the same mobile device 104 upon which the mobile wallet executes, but through a different application (as opposed to having an initiating device which is not separate and distinct from the user mobile device 104). The process 400 is performed using the mobile payment provisioning system 100 shown in FIG. 1, including the user mobile device 104, the source account FI computing system 108, the mobile wallet provider computing system 106, and the TSP computing system 110.

At 402 of the process 400, the source account FI computing system 108 provides the source account FI client application 122 to the user mobile device 104. In an example embodiment, the client application 122 is a mobile banking application issued by or on behalf of the source account FI computing system 108. Hence, for example, operation 402 may comprise the user downloading a mobile banking application to the user mobile device 104.

At 404, the mobile wallet user initiates provisioning of a source payment account to a third party mobile wallet using the source account FI client application 122. The mobile wallet user may utilize an interface generated by the source account FI computing system 108 and provided via the client application 122. The interface may be similar to that described in process 200. In some embodiments, the user is required to authenticate to the client application 122 prior to accessing the interface or otherwise initiating provisioning of the payment account. For instance, the user may be required to provide authentication credentials associated with the source financial institution, including one or more of a user name, password, PIN, biometric information, and the like. In other embodiments, the authentication credentials may be related to the user's mobile wallet account, or other authentication credentials associated with the user and available for verification by the source account FI computing system 108. Once authenticated, the user may be provided with sensitive account information associated with the user, including a user interface providing a listing of payment accounts available for provisioning to the user's third party mobile wallet.

As part of a provisioning request, the user selects a source payment account. The source payment account is selected from one or more payment accounts held by the user and provided by the source account FI computing system 108. The source payment account may be selected from a list provided by the source account FI computing system 108 (i.e., via the client application 122). The user may also identify the user's third party mobile wallet provider as part of the provisioning request. For instance, the user may provide an identifier associated with the mobile wallet provider, mobile wallet account, device, and/or the user in order to identify the provider associated with the mobile wallet account. Once the source account (and any other information required from the user) is provided, the client application 122 (e.g., the source account FI computing system 108) provides the user with a link or other selectable option to initiate provisioning of the source payment account.

The source account FI computing system 108 also receives address information from the user mobile device 104 at 404. The address information includes a return address for the provisioned payment token, enabling a token service provider (or another provisioning entity) to locate (e.g., identify) the user's mobile wallet account, and to provision the payment account (e.g., the payment token) to the correct mobile wallet (i.e., the mobile wallet account held by the user). In some embodiments, the mobile wallet user sends the address information to the source account FI computing system 108 using the client application 122. For instance, the client application 122 may provide a link or other selectable option that causes the user mobile device 104 to extract the address information from the mobile device 104, encrypt the information, and send to the source account FI computing system 108 (e.g., via the client application 122). In some embodiments, the client application 122 communicates with the mobile transaction circuit to obtain the address information. In an example embodiment, the source account FI computing system 108 (e.g., via the client application 122) prompts the user to initiate communication of the address information upon receiving selection of a source account to be provisioned.

At 406, the source account FI computing system 108 sends a message to the mobile wallet provider computing system 106 (i.e., the third party mobile wallet provider), notifying the mobile wallet provider computing system 106 that a provisioning request has been received for a mobile wallet provided by the system 106. The message may include any of the information received from the mobile wallet user and/or the user mobile device 104, including identification of the user, the payment account, the address information, or any other relevant information. Transfer of such information may be authorized by the mobile wallet user prior to sending. The source account FI computing system 108 may also receive information from the mobile wallet provider computing system 106 at 406, including address information (e.g., location information, a return address, a mobile wallet identifier) related to the mobile wallet of the user or formatting requirements for any provisioned payment token.

At 408, the mobile wallet provider computing system 106 sends the provisioning request to a token service provider (e.g., TSP computing system 110). The TSP computing system 110 provisions a payment token based on the provisioning request. Once provisioned, the payment token is associated with (e.g., assigned to) the source payment account and stored in a database of the TSP computing system 110 (e.g., token database 144). At 410, the TSP computing system 110 sends the payment token to the mobile wallet provider computing system 106. At 412, mobile wallet provider computing system 106 sends the payment token to the user mobile device 104.

Figure 5:
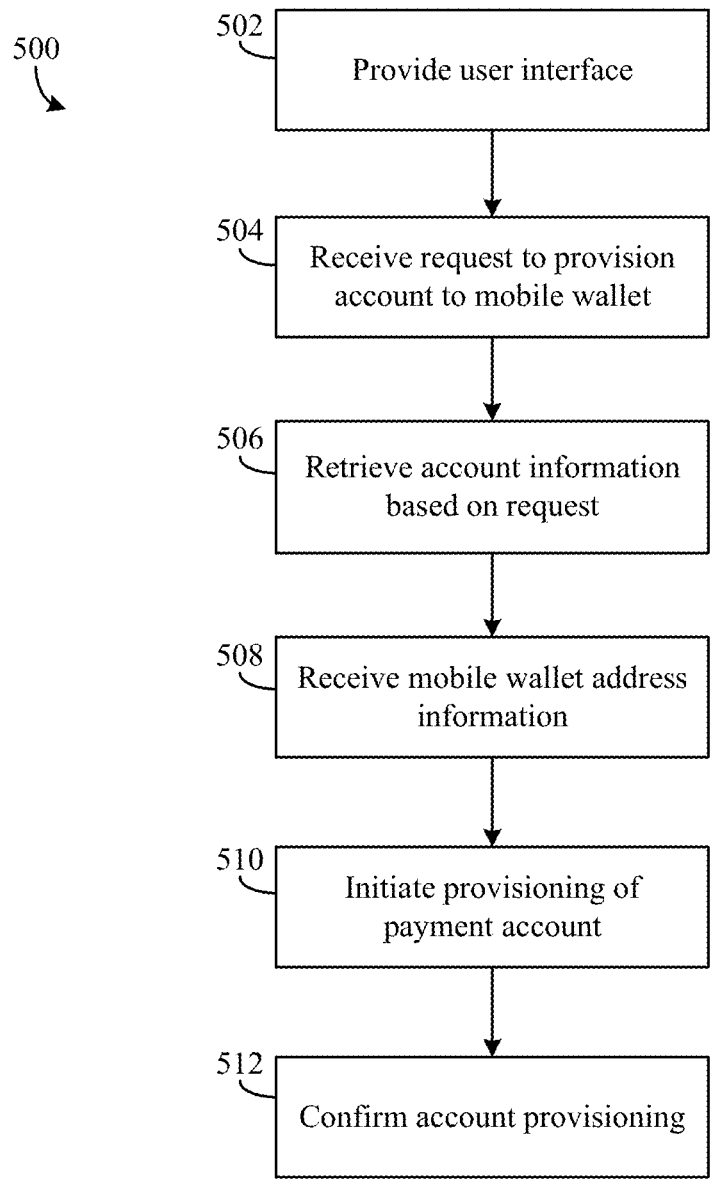
FIG. 5 is a schematic flow diagram of a process for provisioning a payment account to a mobile wallet using the system of FIG. 1, according to another example embodiment.

Referring now to FIG. 5, process 500 is shown for initiating provisioning of a payment account to a mobile wallet of a user, according to an example embodiment. The process 500 is performed by a source financial institution (i.e., the provider of the source payment account) in this embodiment, including the source account FI computing system 108 and an initiating device (e.g., initiating device 102) associated with the source financial institution.

At 502, the source account FI computing system 108 provides a user interface to a user (e.g., customer, banker) at the initiating device 102. The user interface is an interface configured to enable communication between the user and the source account FI computing system 108, including to exchange information required to initiate provisioning of a payment account to the user's mobile wallet. The user interface is generated by the source account FI computing system 108. At 504, the source account FI computing system 108 receives a request from the mobile wallet user to provision a payment account to the user's mobile wallet, including selection of the source payment account. The request is received via the user interface provided at the initiating device 102. The mobile wallet user may be required to authenticate to the initiating device 102 (e.g., in the case of an ATM) prior to sending the provisioning request.

At 506, the source account FI computing system 108 retrieves account information for the selected payment account based on the provisioning request. At 508, the source account FI computing system 108 (i.e., via the initiating device 102) receives address information for the user's mobile wallet account from the user mobile device 104. The address information may be provided upon request from the source account FI computing system 108. The address information may be received upon initiation of a communication event between the user mobile device 104 and the initiating device 102. In an example embodiment, the address information is encrypted by the mobile device before it is transmitted. The source account FI computing system 108 may also receive one or more encryption keys to decrypt the information received.

At 510, the source account FI computing system 108 initiates provisioning of the selected payment account based on the payment account and address information. For instance, the source account FI computing system 108 may send the information to a token service provider as part of a provisioning request. In other embodiments, the source account FI computing system 108 sends the information to a mobile wallet provider (e.g., the mobile wallet provider computing system 106) to initiate provisioning. At 512, the source account FI computing system 108 (e.g., the initiating device 102) receives verification that the source payment account has been provisioned (e.g., a payment token has been provisioned based on the payment account, the payment token has been stored at the user mobile device 104, etc.). The source account FI computing system 108 may send a confirmation to the mobile wallet user (e.g., via the initiating device 102, via the client application 122) that the payment account has been provisioned to the user's mobile wallet.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g, flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for provisioning a payment account to a mobile wallet on a mobile device, the method comprising:
   receiving, by a provider computing system from an initiating device comprising at least one of a banker computing device, an automated teller machine device, or a point of sale device, an encrypted network return address of the mobile wallet that uniquely identifies a network address of the mobile wallet;
   receiving, by the provider computing system and from the mobile device, an encryption key configured to decrypt the encrypted network return address, wherein the encryption key is not provided to the initiating device;
   decrypting, by the provider computing system, the encrypted network return address using the encryption key;
   determining, by the provider computing system, the decrypted network return address of the mobile wallet based on the decryption of the encrypted network return address; and
   provisioning, by the provider computing system, a payment token associated with the payment account to the mobile wallet based on the decrypted network return address received from the initiating device by transmitting the payment token to the mobile device without going through the initiating device.

2. The method of claim 1, wherein the payment token is associated with a primary account number of the payment account.

3. The method of claim 1, wherein the payment token comprises at least one of a digital token associated with sensitive information configured for interpretation by an authorized computing system or a code configured for utilization as a payment credential.

4. The method of claim 1, wherein the payment account comprises a credit card or debit card account, and wherein the payment token comprises a sixteen digit number configured for utilization in place of an original sixteen digit number of the credit card or the debit card.

5. The method of claim 1, further comprising authorizing the payment token for use in a mobile wallet transaction.

6. The method of claim 1, wherein the payment token is sent directly to the mobile device without going through the initiating device.

7. The method of claim 1, wherein the encrypted network return address of the mobile wallet is received by the provider computing system based on a short-range communication of the encrypted network return address from the mobile device associated with the mobile wallet to the initiating device so that the encrypted network return address is encrypted prior to being received by the initiating device.

8. The method of claim 1, wherein the initiating device and the mobile device are separate and distinct from each other.

9. A device, comprising:
   a network interface circuit enabling the device to exchange information over a network; and
   a circuit coupled to the network interface circuit and configured to:
     send, via the network interface circuit, to an initiating device comprising at least one of a banker computing device, an automated teller machine device, or a point of sale device, an encrypted network return address of a mobile wallet, wherein the encrypted network return address of the mobile wallet is configured to be decrypted using an encryption key and, wherein the encrypted network return address is encrypted before being transmitted from the device to the initiating device;
     send, via the network interface circuit, the encryption key to a provider computing system, wherein the encryption key is not provided to the initiating device; and
     receive, via the network interface circuit from the provider computing system, a payment token associated with a payment account for provisioning to the mobile wallet, wherein the payment token is received over the network from the provider computing system based on the decrypted network return address, wherein the decrypted network return address is not provided to the initiating device.

10. The device of claim 9, wherein the circuit is further configured to at least one of extract, encrypt, or communicate a unique identifier associated with the encrypted network return address for the mobile wallet as part of a request to provision the payment account.

11. The device of claim 9, wherein the circuit is further configured to provide, via a barcode, the encrypted network return address to the initiating device.

12. The device of claim 9, wherein the circuit is further configured to transmit the payment token as part of a mobile wallet transaction.

13. The device of claim 9, wherein the circuit is further configured to receive and display a screen comprising account information associated with the payment account.

14. The device of claim 13, wherein the screen is configured to request authentication credentials from a user.

15. The device of claim 9, wherein the circuit is configured to provide, via the network interface circuit, a confirmation that the payment account is provisioned to the mobile wallet.

16. The device of claim 9, wherein the circuit is configured to:
receive authentication information from a user, wherein the authentication information is associated with a provider institution; and
authenticate the user based on the authentication information, wherein a user interface is displayed upon authenticating the user.

17. The device of claim 9, wherein the encrypted network return address is a network return address of the device, and wherein the payment token is received by the device via the network return address.

18. A system, comprising:
a network interface circuit enabling the system to exchange information over a network; and
a customer database coupled to the network interface circuit, the customer database storing financial information for a plurality of customers, wherein the system is configured to:
receive, by the network interface circuit, from an initiating device comprising at least one of a banker computing device, an automated teller machine device, or a point of sale device, an encrypted network return address of a mobile wallet, wherein the encrypted network return address is received from the initiating device based on a transmission of the encrypted network return address from a mobile device to the initiating device, the encrypted network return address uniquely identifying a network address of the mobile wallet;
receive, by the network interface circuit from the mobile device, an encryption key configured to decrypt the encrypted network return address of the mobile wallet;
decrypt the encrypted network return address of the mobile wallet using the encryption key; and
initiate, by the network interface circuit, provisioning of a payment account to the mobile wallet via the decrypted network return address without sending the decrypted network return address to the initiating device.

19. The system of claim 18, wherein the system is further configured to:
provide, by the network interface circuit, a user interface to the initiating device, the user interface enabling communication between a user of the initiating device and the system.

20. The system of claim 19, wherein the system is configured to:
receive, by the network interface circuit, confirmation that the payment account is provisioned to the mobile wallet; and
display, by the network interface circuit, the confirmation to the user via the user interface.

* * * * *